United States Patent [19]
Grouell

[11] Patent Number: 5,892,655
[45] Date of Patent: Apr. 6, 1999

[54] HARD DISK DRIVE HEAT SINK

[75] Inventor: William L. Grouell, San Ramon, Calif.

[73] Assignee: Sun Microsystems, Inc., Mountain View, Calif.

[21] Appl. No.: 883,847

[22] Filed: Jun. 27, 1997

[51] Int. Cl.$^6$ .................................................. H05K 7/20
[52] U.S. Cl. ........................ 361/690; 361/704; 361/714; 361/715; 174/16.3; 165/80.3; 165/80.2
[58] Field of Search .................... 361/687, 690, 361/692, 704, 709, 710, 711; 174/16.3, 16.1; 165/80.2, 80.3

[56] References Cited

U.S. PATENT DOCUMENTS

| | | | |
|---|---|---|---|
| 4,414,604 | 11/1983 | Matsui et al. | 361/385 |
| 4,754,101 | 6/1988 | Stickney et al. | 361/818 |
| 5,016,139 | 5/1991 | Stopa et al. | 361/386 |
| 5,204,497 | 4/1993 | Herrick | 361/687 |
| 5,253,133 | 10/1993 | Guo | 360/97.01 |
| 5,311,928 | 5/1994 | Marton | 165/80.3 |
| 5,625,229 | 4/1997 | Kojima et al. | 361/697 |

FOREIGN PATENT DOCUMENTS

29601645U1  3/1996  Germany .

Primary Examiner—Leo P. Picaro
Assistant Examiner—Boris L. Chervinsky
Attorney, Agent, or Firm—Julian Caplan; Flehr Hohbach Test; Albritton & Herbert LLP

[57] ABSTRACT

A plate formed with louvers and a depression to heat engage a hard disk drive motor is attached to such a drive. Heat from the motor is transferred to the plate. The louvers dissipate heat especially if they are in the path of a blower. The plate also protects the user from contact with drive components if touched during installation or removal of the drive while the drive is connected to a computer while electrically energized.

3 Claims, 1 Drawing Sheet

HARD DISK DRIVE HEAT SINK

BACKGROUND OF THE INVENTION

1. Field of the Invention

This invention relates to a hard disk drive heat sink. More particularly, the invention relates to a louvered plate which is fixed to a disk drive to dissipate heat and protect the user and also the disk drive components from damage if the heat sink is installed or removed while the computer to which it is attached is energized.

2. Description of Related Art

Heat sinks of various types are well known and are commonly attached to electrical components of printed circuit boards and power supplies. The present invention applies a particular heat sink to a hard disk drive in such a manner that the heat from the motor of the drive is dissipated.

SUMMARY OF THE INVENTION

The computer industry is moving toward storage of data on disk drives requiring less space. Multiple disk drives use individual canisters enclosing each drive for ease of handling while the user installs or removes the drive from the computer while the system power is on. Use of such canisters reduces the storage per unit volume and adds expense. As the data density and transfer rates of the drives increase, more heat is generated. The present invention addresses dissipation of this heat without increasing the volume occupied by the individual drive. Accordingly, the present invention transfers heat from the disk drive motor to the surrounding atmosphere.

A plate of thermally conductive material is employed using industry standard threaded mounting points. The plate is formed by means such as a depression which is in intimate thermal contact with the portion of the disk drive which holds the spindle motor. This enables the heat generated by the motor to be transferred to the plate and dissipated into the surrounding air. To facilitate such dissipation, the plate is provided with louvered fins to present a large surface area to the air around the drive and also to control the air flow of the electrical components of the drive's printed circuit board assembly. The heat escapes into the air before it can be transferred to other components of the drive, and hence lengthens the life of the drive components.

Another advantage of the invention is that the user is protected from the hot components of the drive, including the electrical components on the printed circuit board when handling the drive in a situation where one drive is exchanged for another. The user is protected from contact with the possibly dangerous power available in the system when changing disk drives with the power on. Correspondingly, the disk drive is also protected from damaging electrostatic discharge and handling damage by the user.

BRIEF DESCRIPTION OF THE DRAWINGS

The accompanying drawings, which are incorporated in and form a part of this specification, illustrate embodiments of the invention and, together with the description serve to explain the principles of the invention.

DESCRIPTION OF THE PREFERRED EMBODIMENT

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 1:
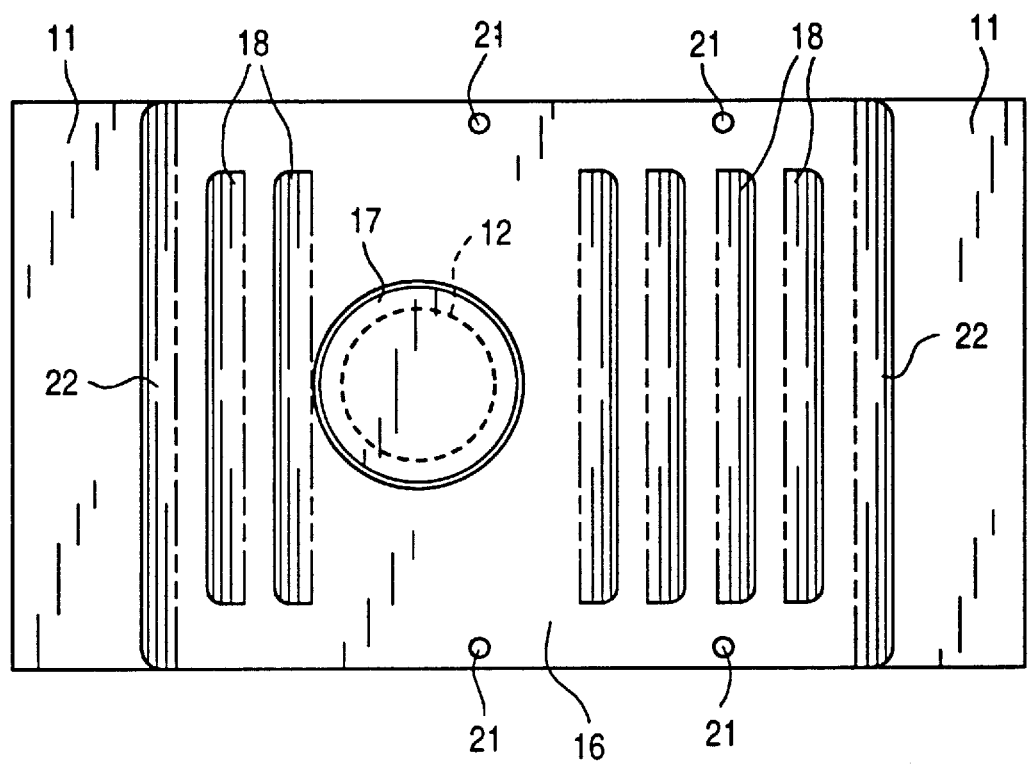
FIG. 1 is a top plan view showing schematically a disk drive to which the present invention is attached.
Figure 2:
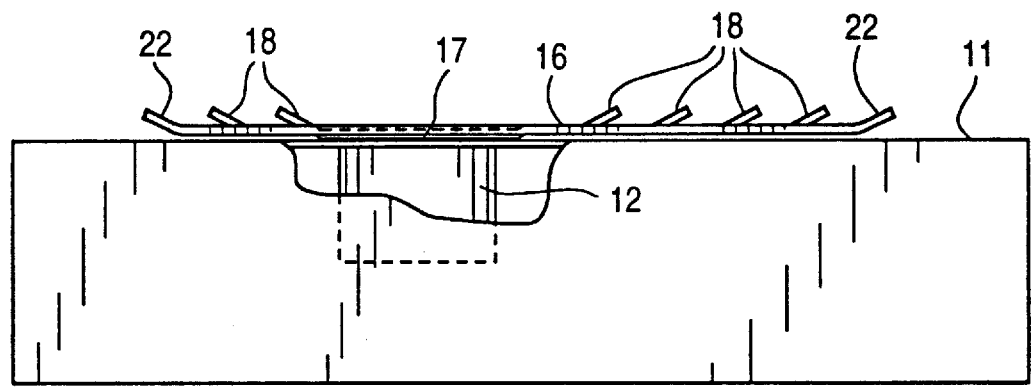
FIG. 2 is a side elevational view of the structure of FIG. 1.

Hard disk drive 11 is shown schematically in FIG. 1. Customarily, such a drive has a printed circuit board on which are mounted a number of electronic components. Also in the drive is a motor 12 which generates considerable heat. The drive 11 may be installed and removed from sockets in a computer even while the computer is turned on. The present invention protects the user from potentially high voltages of the components and correspondingly protects such components from damage by contact with the user.

A thin plate 16 may be used for the heat sink. Material such as sixteen gauge aluminum may be used in its fabrication. At a location immediately above the location 12 of the drive motor, a depression 17 is stamped into the plate so that the plate establishes intimate contact with the motor. It will be understood that ordinarily the motor 12 generates a substantial portion of the heat which is discharged by the drive 11. To facilitate transfer of heat from plate 16 to the surrounding atmosphere, fixed louvers 18 or fins are struck up from the plate at various location. As shown in FIG. 1 there are four such louvers 18 at the top above depression 17 and two below. It will be understood that this arrangement may be varied for various reasons such as the location of the depression 17. Frequently air is blown across the disk drive 11 for heat dissipation purposes and the louvers 18 are designed to augment such heat dissipation. Screw holes 21 are formed in plate 16 in accordance with industry standard locations for cover attachments of disk drives.

The ends 22 of plate 16 are slanted upwardly-outwardly.

In use, because the depression 17 is in contact with the drive motor, the heat of the motor is transferred to the plate 16 and by means of the louvered fins 18 transmitted to the surrounding air. If a blower is used to blow air across the plate 16, very efficient heat transfer is obtained.

Furthermore, it is presently common practice to remove and install disk drives 11 while the current of the computer is turned on. The plate 16 acts as a shield to protect the fingers of the user from coming in contact with high voltage electrical components of the disk drive and likewise to prevent fragile components of the drive from being damaged by contact with the fingers of the user.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A shield for use with a hard disk drive having a rectangular shape when viewed in plan, said hard disk drive having a heat emitting motor and heat emitting components, comprising a rectangular plate having a rectangular shape when viewed in plan and having two sides spaced no farther apart than the overall width of said hard drive, said plate being formed with a plurality of louvers to dissipate heat to the atmosphere, each said louver comprising a fixed rectangular fin within said rectangular shape slanting upwardly from said plate, each said fin having three edges comprising a longitudinal edge having ends spaced inward from said sides and two side edges at said ends perpendicular to said longitudinal edge, said fin having a fourth edge integral with said plate and spaced from and parallel to said longitudial edge, said fourth side interconnecting said side edges, each said fin being connected to said plate and located between said sides.

2. A shield according to claim 1 in which said plate is formed with a depression located to contact the motor when said plate is attached to the drive.

3. A shield according to claim 1 in which said plate is formed with outward-upward slanted end edges.

* * * * *